March 13, 1962     D. G. LA RUE     3,024,614
FLUME OUTLET
Filed April 5, 1957
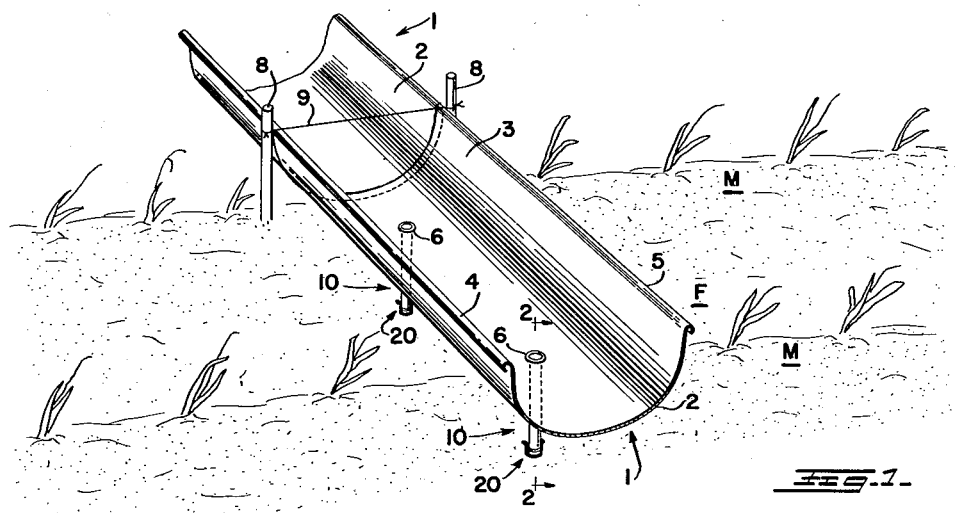
Fig. 1
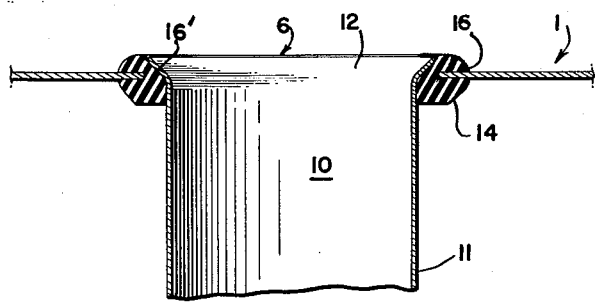
Fig. 2
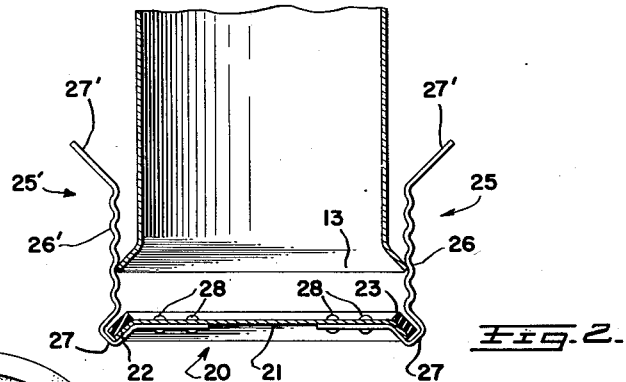
Fig. 3
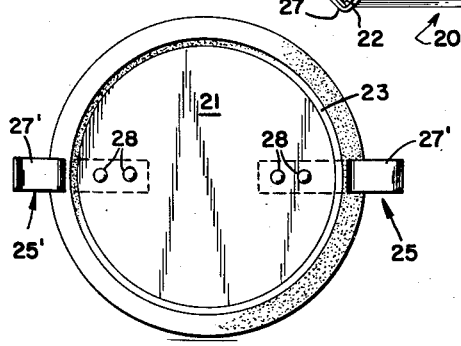
INVENTOR
DONALD G. LARUE
BY *James E. Toomey*
ATTORNEY

United States Patent Office 3,024,614
Patented Mar. 13, 1962

3,024,614
FLUME OUTLET
Donald G. La Rue, Orinda, Calif., assignor to Kaiser Aluminum & Chemical Corporation, Oakland, Calif., a corporation of Delaware
Filed Apr. 5, 1957, Ser. No. 650,878
4 Claims. (Cl. 61—15)

This invention relates to irrigation systems. More particularly, the present invention relates to the manner of controlling fluid flow in such systems and assuring proper and sufficient distribution of the irrigating fluid to all areas of a field or the like under irrigation without washing away of the soil and without unnecessary wastage of the fluid or leakage of the system or other deleterious results.

A prime example of an advantageous manner in which the instant invention may be used is in the irrigation of so-called hillside crops, a specific example of which is pineapple as grown in the Hawaiian Islands. The climate of this area is such that this particular crop requires considerable irrigation. Because of the terrain limitations of the area, pineapples are generally grown on hillsides where the problem of proper distribution of the irrigating fluid such as water becomes relatively complicated as will be subsequently apparent.

Hillside crop rows are generally disposed transversely to the direction of slope of a hill. This is done to prevent undue run-off of the water applied to the furrows. Consequently, it is necessary that fluid be carried to the furrows transversely to their direction along the sloping ground such that the conduits or flumes used to carry the fluid to the field will be positioned parallel to the slope. Thus, the irrigating fluid must flow from top to bottom thereof and as a result the fluid develops considerable velocity as it moves down the flumes. The increasing velocity or rate of flow makes it extremely difficult to control the rate of discharge of the water into each furrow. Improper control of the water results in soil erosion, uprooted crops and even in some cases, flooding of the lower portions of the area. Thus, proper control and rate of discharge of the fluid from the flumes are of prime importance.

The present invention has therefore for one of its primary objects the production of an irrigation discharge control system which will assure proper and equal distribution of the irrigating fluid under varying conditions of flume installation and water velocity.

Another object of the invention is to provide an irrigation system which may be readily assembled and disassembled for use in various and different locales.

Still another object of the invention is to provide a distribution outlet for irrigation systems in which the rate of discharge therefrom may be varied.

A further object of the invention is to provide an irrigating system with discharge outlets in which the direction of discharge of the irrigating fluid may be controlled.

An additional object of the invention is to provide an irrigating flume or conduit with outlets which will not cause undesired spillage or wastage of the irrigating medium from the flume.

Another object of the invention is to provide an irrigation distribution outlet which may be operated by unskilled persons, which will not cause excessive erosion of the soil adjacent the discharge point, and which is simple in construction.

These and other objects of the invention are accomplished by providing a furrowed growing area with a series of parallel conduits or flumes arranged transversely of the direction of the furrows, providing a series of outlets in the bottom of the flumes spaced apart a distance equal to the furrow distance, removably fixing suitable and generally vertically disposed tubes or flume gates of varying diameter in the outlets and further by providing a control and fluid deflection means in adjustable relation with respect to the discharge end of said gates regulating and directing the flow of water or the like into the furrows without localizing the discharge of the water so as to cause soil erosion thereby.

Considering now the attached drawings and the following detailed description of the invention, it will be seen that FIGURE 1 is a top and side perspective view of a portion of an irrigating system as installed in a field under cultivation.

FIGURE 2 is a broken sectional view somewhat enlarged, taken along the line 2—2 of FIGURE 1 with only part of a flume being shown, and FIGURE 3 is a plan view of the cap device for a flume outlet.

Considering now FIGURE 1, it may be seen that the field in which the crop is growing is so cultivated that the crop is grown along the tops of a plurality of parallel mounds of earth M. These mounds are separated by a series of parallel valleys F known as furrows into which it is a general practice to introduce the irrigating fluid.

The irrigating fluid may be transported to the area to be irrigated by means of a series of similar opened-top trough sections 1 known as flume sections. Such flume sections are generally of inverted U-shape in cross section and have one end 2 slightly smaller than the other end 3. The uppermost edges of the U-shaped flume sections are generally provided with beads 4 and 5 which serve to reinforce the sides and edges of the sections. The flume sections 1 are connected together by simply laying the smaller end 2 of one flume section within the larger end 3 of another and similar flume section. This arrangement is preferred since the flume sections 1 are usually formed of a given convenient length for easy handling and quick installation and removal. Therefore, a series of identical flume sections 1 may be arranged in alignment from the top to the bottom of a hill by the simple expedient of interfitting the proper ends thereof as has been described.

In order to position the flume sections properly above the earth, it is customary to drive into the ground closely adjacent and to either side of each section, and preferably closely adjacent the joints formed by contiguous sections, a pair of identical stakes 8 as shown in FIG. 1. Between these stakes 8 and stretched above and below the flume is a readily twistable wire 9 which serves to anchor the flume to the pair of stakes. The anchoring system may be repated along the entire length of the desired flume for as often as may be necessary to assure proper positioning of the flume with respect to the row of crops and also to assure proper connection and stabilization of the described joints between the individual sections making up a complete flume. It will be noted that each of the flume sections is provided with one or more circular apertures 6. These apertures 6 are generally provided at the very bottom of the individual flume sections 1 and may be of varying diameter as and for a purpose to be hereinafter described.

It may be surmised that the apertures 6 in the bottom of flume sections 1 would be an adequate means whereby the water being transported in the flumes may be discharged in the proper furrows. However, such a supposition is inaccurate in view of the fact that the velocity of the water passing through a series of flume sections 1 is considerable. This is particularly true where the flumes are applied to a hillside of considerable slope. Thus, instead of passing directly through the openings 6, there will be a distinct tendency of the water to pass completely over the opening 6 such that only a very small amount of the water will be discharged in the desired furrows. In order to overcome this difficulty and many other difficulties in connection with such systems, many devices have been inserted within the flume body in an attempt to scoop or direct the water through the proper apertures. The result of these endeavors has not been entirely satisfactory in that the water is caused to spill over the top of the beaded edges 4 and 5 and will not at all times follow the desired path once it is discharged through the aperture 6.

Therefore, the present invention contemplates the use of a series of flume gates. Each gate comprises a tubular body 10 and a cap member 20. One of these is shown clearly in FIGURE 2. The body 10 of each flume gate is provided at its top and bottom with outwardly flared edges 12 and 13, the angle of flaring being identical in both cases. The tubular body 10 is inserted within an aperture 6 and held in place by means of a suitable gasket 14. The gasket 14 may be provided around its outermost circumferential edge with a groove 16 which is adapted to be engaged with the annular edge defining the aperture 6 in a given flume section 1. The innermost circumference of the gasket is provided with a sloping annular wall 16' which is of the same general angle as the angle of flare of flared end 12 of the tubular body 10 and adapted to receive this flared end. Thus, it may be seen that, when it is desired to remove the tubular body 10, this may be readily accomplished by sliding the tubular body 10 upwardly until such time as the sloping annular wall 16' of gasket 20 is freed from the flared end 12 at which time the gasket may be rolled out of engagement with the annular edges of apertures 6 and the entire apparatus lifted free of the flume sections. The process is repeated in reverse when the tubular body 10 is installed within the flume section.

Considering now the discharge end of the tubular body 10, it may be seen that this flanged end 13 is provided with a cap member 20. The purpose of this cap member is three-fold. First of all, it will interrupt the passage of the water passing downwardly through the tube and cause it to fan-out, that is discharge over a wide area, rather than discharge at a localized point or area such as would cause erosion of the soil. Secondly, the cap may be used to direct the flow in a manner to be subsequently described and thirdly, the cap may be used to meter the amount of water that passes through the tubular body 10. This cap member 20 is comprised of a circular disc 21 having its peripheral edge provided with a sloping wall 22. The wall 22 is disposed at an angle which is equal to the flare angle of the flared portion 13 on the end of the flume gate 10. A suitable annular gasket member 23 is provided on the sloping wall and is adapted to engage and register with and against the flanged end 13 of the tubular body 10. The cap member is positioned and held on the end of the tubular body 10 by means of a pair of identical clip members 25, 25'. These clip members 25, 25' are fixed to the cap 21 as by rivets 28 or the like and include portions 27, extending downwardly around the edge of the annular sloping edge 22 and upward in generally parallel but diametrically aligned and spaced relation.

The clips 25, 25' further include corrugated portions 26, 26' as well as the outwardly angled top portions 27'. Preferably, the material used to form the clips 25, 25' has inherent springiness or resiliency such that the clips 25, 25' may be pulled apart and will tend to return to their normal parallel position. When the clips 25, 25' are in their normal parallel positions, it may be seen that the corrugated portions 26, 26' will engage the edge or lip of flared ends 13 and lock the cap 20 thereon. Because of the outwardly angled top portions 27', insertion of fingers or the like between the wall of the tubular body 10 and the ends of the corrugated clips 25, 25' is greatly facilitated such that the clips 25, 25' may be separated and thus freed from engagement with the flared end 13 of tube 10. By selectively engaging certain portions of each of the corrugated portions 26, 26' with the edge of flared end 13 of the tubular body 10, the relative position of the cap members 20 with respect to the end of the tube 10 may also be varied.

The manner in which the cap members 20 are locked to the discharge end of the tubular body 10 is of prime importance. For example, where it is desired to direct the water discharge in a given direction the cap is rotated in such a manner that the two clip members 25, 25' generally parallel the direction in which it is desired to discharge the water. The corrugated portion 26 of clip 25, for example, may be caused to be locked with the flange 13 such that the cap member 20 is flush against the conical flange on one side. The corrugated portion 26' of the other clip 25', for example, would be caused to engage the flange 13 of the tubular body at approximately the second corrugation from the bottom, and thus the cap member 20 would be tilted or cocked with respect to the end 13 of the tubular body 10 and water passing therethrough would be caused to fan-out or spray in a direction generally paralleling that direction in which the cap is tilted. The amount of discharge from the tubular body 10 may be regulated by the distance by which the cap member is spaced upward or downwardly relative to discharge end 13 thereof.

Thus, it may be seen the instant invention contemplates a simple control member which may be operated by unskilled labor to produce the desired result and which will have the effect of preventing localized discharge of the irrigating water with resultant soil erosion while at the same time facilitating regulation of the supply of irrigating water to the individual furrows.

It will be remembered that mention is made of the fact that the flumes themselves may be provided with apertures 6 of varying diameter. Similarly, the tubular bodies 10 may be made of varying diameter. This arrangement is preferred, though not absolutely necessary, where it is most desirable that the greatest amount of water be delivered to the top of a hillside field. This variation may be necessary where the irrigating water would have a marked tendency to run down the field even though the field is properly furrowed. Such run-off causes a great accumulation of water at the bottom of the hill. Therefore, it is often desirable that the rate of discharge of the various flume gates along the flumes and into the furrows F is regulated in an inverse order such that the water is discharged at a lesser rate at the lower end of the field and a higher rate at the top end of the field. Thus, by selecting flume sections having apertures 6 of varying diameter, a flume may be assembled wherein the discharge of the water from the flume may be so regulated as to assure proper distribution over the acreage to be cultivated.

It is to be noted that no diversion plates, scoops or the like will be necessary in the flume sections 1, which would ordinarily cause spillage over the beaded sides 4 and 5. This is because the tubes 10 operate on a siphon principle. When the flume sections 1 are set up and the irrigating water initially enters, it will tend to fill up the gates 10. This is because velocity will not be built up at such a rate as to cause the water to by-pass the apertures 6 until each flume gate 10 is completely filled with water. It is a well known principle of physics that as water in a column is displaced, it will tend to draw by suction into the top of the column an amount of air or other substance equal to the volume of displaced fluid. Thus, as the flume gates are filled and begin to discharge from the bottom, there is created a tendency at the top thereof to draw by suction water passing across the apertures 6 from the flume sections 1 into the tubular body 10, and thus, the tubular body 10 will be continuously filled. Since there is nothing in the path of the water flow in the flume sections 1 to cause turbulence in the moving fluid, there will be no spillage over the sides of the flume sections as is often the case where scoops or diversion plates are inserted in the flume sections.

While the instant invention has been described in connection with irrigation of a particular crop and under particular circumstances, it must be realized that it is capable of broad application and changes may be made all of which are within the spirit and scope of the invention which is limited only as defined by the following appended claims, wherein

What is claimed is:

1. A fluid control and discharge gate for use in irrigating systems including closed bottom flume sections provided with spaced apertures comprising a vertically disposed tubular body removably fixed in each of said apertures and projecting below the bottom of a flume section, said tubular body having top and bottom flared ends, means for releasably connecting the top end of the tubular body to the bottom of said flume section, removable cap means rotatably and tiltingly affixed to the bottom end of the tubular body, and corrugated clip means engageable with the bottom flared end of the tubular body for removably, tiltingly and rotatably affixing the cap means to the tubular body whereby the cap means can selectively vary the rate and the direction of the fluid discharge from the tubular body.

2. A fluid control and discharge gate as defined in claim 1 wherein said means for releasably connecting the top ends of said tubular bodies to said flume sections comprises pliable annular gasket members each having an outer surface including a peripheral groove adapted to engage the annular edge of the flume section defining said apertures, and an inner conical wall portion complimentary to and engageable with the flared top end of a tubular body, a further portion of said inner wall being of substantially the same diameter as the diameter of the outer surface of said tubular body to slidably but sealingly fix said flared top end against said conical wall portion.

3. In a flume construction for irrigating systems including a tubular body having a flared end for discharging water from said flume to the ground to be irrigated, the improvement comprising means at the discharge end of said tubular body for regulating the flow of water through said tubular body, said means comprising a cap member having a conical edge engageable with the flared discharge end of said tubular body, said cap member including a pair of spaced resilient clip elements disposed in diametrically opposite relation thereon, said clip elements including further corrugated portions selectively engageable with the lip of said flared discharge end of said tubular body whereby said cap member may be adjusted angularly about two axes with respect to said discharge end to regulate and direct the discharge of fluid therethrough, said cap member also being selectively positionable with respect to the discharge end of said tubular body to direct the flow therefrom over a relatively wide area to prevent soil erosion therefrom.

4. In an irrigating system, the combination of an open-topped flume having a series of regularly spaced aligned apertures in the bottom thereof and tube means including tubular bodies provided with flared fluid discharge ends removably mounted and projecting below the bottom of the flume in at least certain ones of said apertures, said tube means acting to divert by suction from said flume a portion of a fluid moving in said flume, said tube means further including removable and rotatable cap means for both selectively controlling the rate at which the portion of the moving fluid is diverted from said flume as well as the direction in which the fluid is discharged from the flume, each of said cap means being provided with a pair of spaced elongated clips disposed in diametrically opposite relation to each other for removably and rotatably affixing the cap means to a tubular body, and each of said clips having a resilient portion frictionally engaging the lip of the flared fluid discharge end of the tubular body and another portion which is fixed to a cap means, whereby the cap means can selectively vary the rate and direction of the fluid discharge from the tubular body.

References Cited in the file of this patent

UNITED STATES PATENTS

| | | |
|---|---|---|
| 917,911 | Thompson | Apr. 13, 1909 |
| 1,424,157 | Cook | Aug. 1, 1922 |
| 1,455,551 | Ryan | May 15, 1923 |
| 2,077,725 | Tyler | Apr. 20, 1937 |
| 2,527,047 | Wold | Oct. 24, 1950 |
| 2,737,778 | Wold | Mar. 13, 1956 |
| 2,832,202 | Norum | Apr. 29, 1958 |